United States Patent [19]

Nilsson et al.

[11] Patent Number: 5,268,971

[45] Date of Patent: Dec. 7, 1993

[54] OPTICAL FIBER/METALLIC CONDUCTOR COMPOSITE CABLE

[75] Inventors: Richard C. Nilsson; Timothy A. Oberschlake, both of Hickory, N.C.

[73] Assignee: Alcatel NA Cable Systems, Inc., Claremont, N.C.

[21] Appl. No.: 788,846

[22] Filed: Nov. 7, 1991

[51] Int. Cl.$^5$ .............................................. G02B 6/44
[52] U.S. Cl. .................... 385/101; 385/102; 385/103
[58] Field of Search ............... 385/101, 100, 102, 103, 385/104, 105, 106, 107, 75

[56] References Cited

U.S. PATENT DOCUMENTS

| | | | |
|---|---|---|---|
| 3,305,689 | 2/1967 | Leavy, Jr. et al. | 385/75 |
| 3,865,466 | 2/1975 | Slaughter | 350/96 |
| 3,883,218 | 5/1975 | Slaughter | 350/96 |
| 4,097,119 | 6/1978 | Kumamaru et al. | 350/96.23 |
| 4,191,448 | 3/1980 | Dean et al. | 350/96.23 |
| 4,230,395 | 10/1980 | Dean et al. | 350/96.23 |
| 4,365,865 | 12/1982 | Stiles | 350/96.23 |
| 4,392,714 | 7/1983 | Brüggendieck et al. | 350/96.23 |
| 4,497,537 | 2/1985 | Dench | 350/96.23 |
| 4,606,604 | 8/1986 | Soodak | 350/96.23 |
| 4,645,298 | 2/1987 | Gartside, III | 350/96.23 |
| 4,679,898 | 7/1987 | Grooten | 350/96.23 |
| 4,693,551 | 9/1987 | Blanco et al. | 350/96.23 |
| 4,695,127 | 9/1987 | Ohlhaber et al. | 350/96.23 |
| 4,705,353 | 11/1987 | Wagoner | 350/96.23 |
| 4,729,629 | 3/1988 | Saito et al. | 350/96.23 |
| 4,740,054 | 4/1988 | Becker et al. | 350/96.23 |
| 4,786,137 | 11/1988 | Connelison et al. | 350/96.23 |
| 4,793,686 | 12/1988 | Saito | 350/96.23 |
| 4,826,278 | 5/1989 | Gartside, III et al. | 350/96.23 |
| 4,852,965 | 8/1989 | Mullin et al. | 350/96.23 |
| 4,909,593 | 3/1990 | Harbort et al. | 350/96.23 |
| 4,932,746 | 6/1990 | Calzolari et al. | 350/96.23 |
| 4,944,570 | 7/1990 | Ogelsby et al. | 350/96.23 |
| 4,952,012 | 8/1990 | Stamnitz | 385/107 X |
| 4,960,318 | 10/1990 | Nilsson et al. | 350/96.23 |
| 4,969,706 | 11/1990 | Hardin et al. | 350/96.23 |
| 4,971,419 | 11/1990 | Gartside et al. | 350/96.23 |
| 4,974,926 | 12/1990 | Blee et al. | 385/107 |
| 4,976,509 | 12/1990 | Bachmann et al. | 350/96.23 |
| 4,993,805 | 2/1991 | Abe et al. | 385/101 X |
| 5,015,063 | 5/1991 | Panuska et al. | 350/96.23 |
| 5,039,197 | 8/1991 | Rawlyk | 385/102 |
| 5,046,815 | 9/1991 | Cain et al. | 350/96.23 |

FOREIGN PATENT DOCUMENTS

0320069  6/1989  European Pat. Off. ............ 385/101

Primary Examiner—John D. Lee
Assistant Examiner—Phan Thi Heartney
Attorney, Agent, or Firm—Ware, Fressola, Van Der Sluys & Adolphson

[57] ABSTRACT

The optical fiber/metallic conductor composite cable has a cable core with an optical fiber subgroup and an insulated metallic conductor subgroup. The optical fiber subgroup can be a loose tube construction, a slotted core construction, a unitube/monotube construction or a tight buffer tube construction. The individual insulated wires of the insulated metallic conductor subgroup extend longitudinally within the composite cable. Preferably, the optical fiber subgroup is on the outer periphery of the cable core to provide easy accessibility, but it can be centrally located.

44 Claims, 5 Drawing Sheets

OPTICAL FIBER/METALLIC CONDUCTOR COMPOSITE CABLE

BACKGROUND OF THE INVENTION

1. Field of the Invention

The present invention relates to cables for the transmission of information and, more particularly, to transmission cables having both optical fiber and metallic conductor components.

2. Description of the Prior Art

Optical fiber and copper cables have been used for the past several years to transmit information (voice, data, video, etc.) over relatively long distances. The optical fiber transmission medium is composed of dielectric hair-thin optical fibers. Copper cables have a transmission medium composed of insulated high grade copper conductors.

Optical fiber cable structure families which are currently being used are loose tube, slotted core, monotube and tight tube. In a loose tube structure, several gel filled buffer tubes containing optical fibers are stranded around a central strength member. The slotted core structure has optical fibers precisely placed in gel filled channels or slots. The channels are symmetrical and form a helical path along the longitudinal axis of the cable. A strength member is located in center of the slotted core cable structure. In the monotube structure, all of the optical fibers are in a single, centrally located, gel filled buffer tube. Finally, in the tight buffer tube construction, protective layers are applied in direct contact with each optical fiber so there is no fiber overlength.

All the above cable structures may incorporate various sheath constructions (armored, nonarmored, high strength, self-supporting, flame retardant, etc.) depending on the application and environment.

Optical fiber cables are slowly taking the place of conventional copper cables due to their high bit-rate capacity, small size and light weight. The only concern in moving exclusively to an all-fiber network is in supplying power to the send/receive hardware at the remote terminals, pedestals, etc. Conventional copper cables currently have enough capacity to carry an adequate amount of power to energize the hardware. The power can be obtained by tapping off the neighborhood or household electrical lines, but then localized power outages will also cause telephone outages. There are currently back-up generators which can continually supply electrical power to the copper cables so that the telephone service will not be interrupted. Battery back-ups can also be used, but they are not suitable during long-term (greater than 4–6 hours) power outages.

There currently is not a very economical way to slowly transition from copper cables to optical fiber cables. The costs involved in removing the existing copper cables and installing optical fiber cables are quite high.

SUMMARY OF THE INVENTION

The present invention is designed to overcome the limitations that are attendant upon the use of the prior art cables described above, and toward this end, it contemplates the provision of a novel composite cable which has both optical fiber and electrical power carrying capabilities. The optical fiber/metallic composite cable utilizes both transmission mediums in one sheath to provide the high bit rate capacity of fiber along with the power carrying capability of the insulated metallic conductors.

Since both the fiber and metallic conductors are in one sheath, installation is faster and less costly. The slow transition from copper to optical fiber will also occur much more smoothly.

It is anticipated that the present invention would be applicable for use in many different types of installations including all types of outdoor installation.

It is an object of the present invention to provide a cable design which can combine the various optical fiber cable structures with metallic conductors.

It is another object of the present invention to provide an optical fiber/metallic conductor composite cable which meets established optical, electrical and handling standards.

Still another object is to provide an optical fiber/metallic conductor composite cable having fiber and metallic subgroups which can be easily separated and routed.

A further object is to provide such a cable which may be readily and economically fabricated and will enjoy a long life in operation.

The invention will be more fully understood when reference is made to the following detailed description taken in conjunction with the accompanying drawings.

DESCRIPTION OF THE PREFERRED EMBODIMENTS

Figure 1:
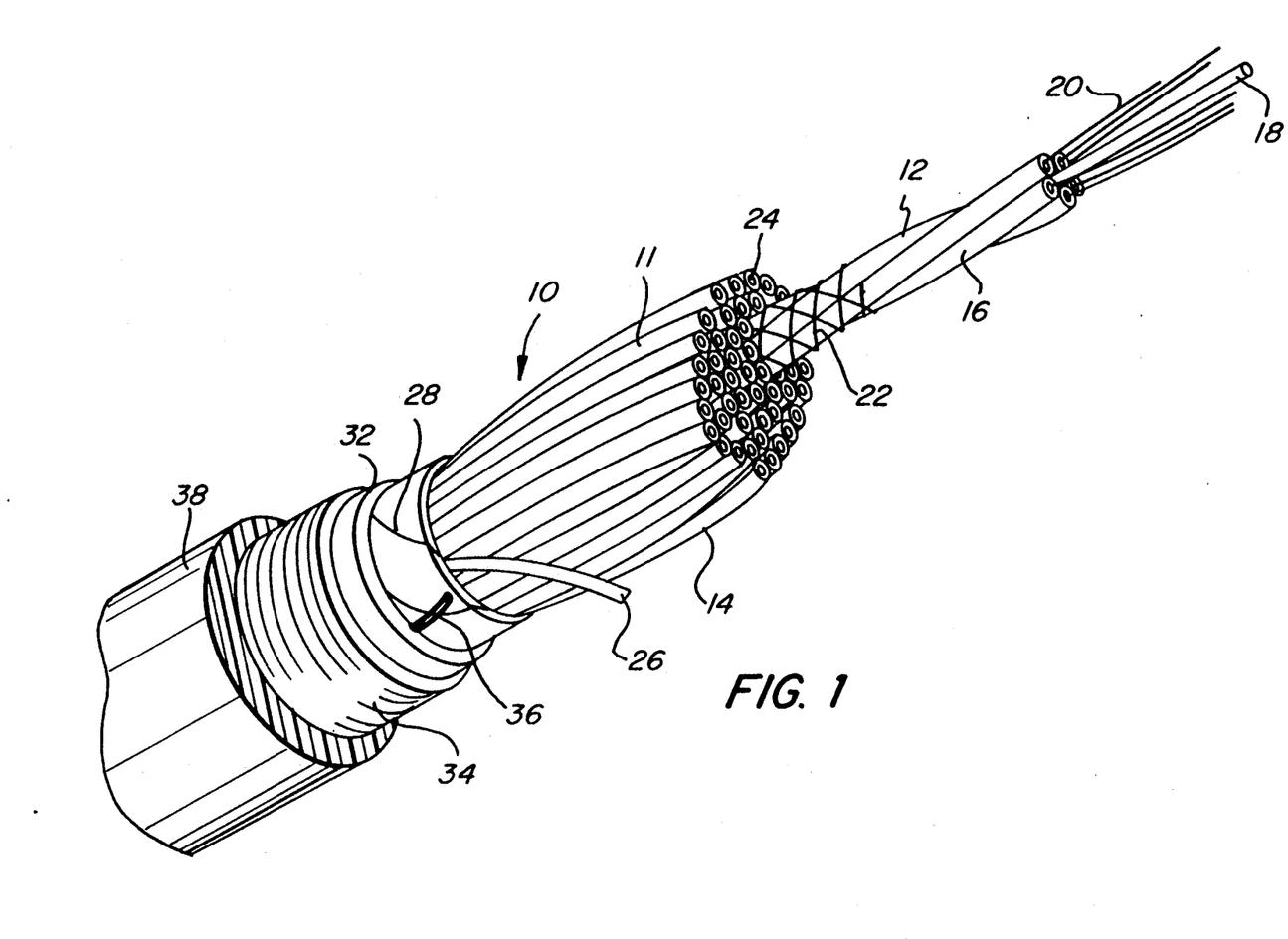
FIG. 1 is a perspective cutaway section of an optical fiber/metallic conductor composite cable of the present invention having loose tube fiber subgroup located near the outer periphery of the cable core.
Figure 2:
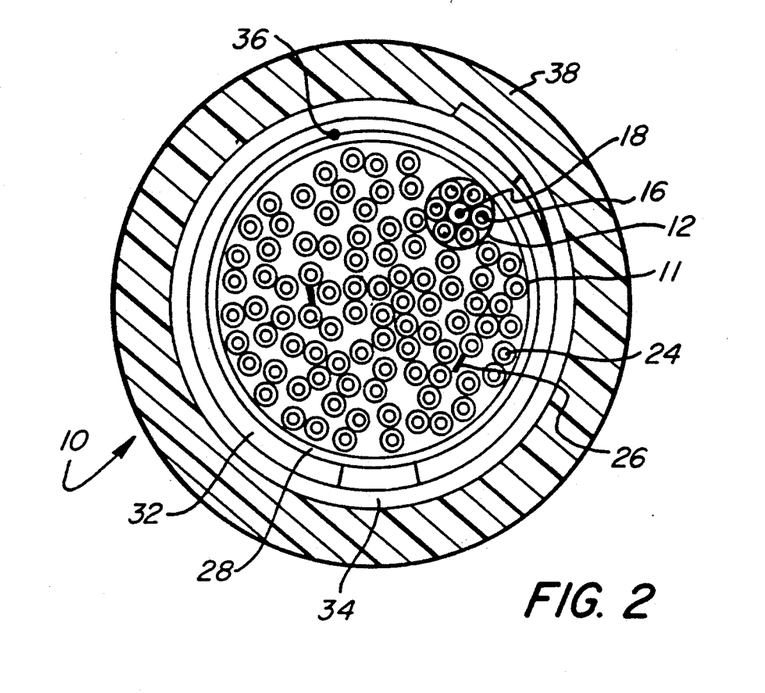
FIG. 2 is a cross-sectional view of the optical fiber/metallic conductor composite cable of FIG. 1.

Turning first to FIGS. 1 and 2, therein is illustrated the armored optical fiber/metallic composite cable design of the present invention generally indicated by the numeral 10 and having a cable core 11 with an optical fiber subgroup 12 and an insulated metallic conductor subgroup 14. The fiber and insulated metallic conductor subgroups are preferably nonstranded so as to run parallel to one another such that the fiber subgroup 12 is always located on the outer periphery of the cable core 11. Alternatively, the subgroups can be stranded together with the fiber subgroup 12 located on the outer periphery of the cable core 11. The stranding method may either be helical or reverse-helical. Either method provides improved mid-span access of both the optical fibers and metallic conductors for branching or tapping.

The optical fiber subgroup 12 includes plurality of gel-filled buffer tubes 16 typically made of color coded thermoplastic such as polyester (PBT). The gel is a thixotropic, water blockable gel which blocks water penetration but allows for fiber movement during cable expansion or contraction. The gel-filled buffer tubes 16 are stranded (helically or reverse helically) around a dielectric or metallic central strength member 18 overcoated with thermoplastic and contain a plurality of optical fibers 20. The optical fibers 20 may be loosely configured, grouped in binder wrapped bundles, or held in a ribbon matrix. One or more binders 22 are used to hold the stranded buffer tubes in place. The binders 22 are typically either threads or thermoplastic tape and may be either helically or contra-helically applied. The optical fibers 20, fiber binders 22, and ribbons are typically color coded for identification.

The insulated metallic conductor subgroup 14 comprises a plurality of color coded, insulated metallic wire conductors 24 grouped in bundles of about twenty-five. The insulated metallic wire conductors 24 extend longitudinally in the composite cable 10 and are bound by metallic conductor group binders 26, typically either color coded threads or thermoplastic tape. Each conductor 24 is made of solid wire or multi-wire commercially pure annealed metal (copper, aluminum, etc.) which is circular in cross-section. The typical American Wire Gauge (AWG) sizes of the metallic conductors are 19, 22, 24 and 26. Other sizes may be used depending on the electrical requirements. The insulated metallic wire conductors 24 are insulated using thermoplastic, paper or pulp materials. The insulation may be foamed in order to produce a lower dielectric constant. The insulation may also be applied in layers in order to optimize electrical and mechanical performance. The individually insulated conductors 24 are typically color coded and twisted in pairs or quads. The pitch of the twist effects the electrical performance of the cable and is typically less than 6.5 inches. The pitch of every twisted conductor group is typically different. If several twisted groups are required, they are typically grouped in stranded bundles wrapped with color coded binders 26. The stranding may be either helical or reverse-helical. The packing density of the insulated metallic conductors 24 is precisely maintained in order to provide low levels of mutual capacitance, cross-talk and attenuation.

The cable core 11 may be filled with a gel or other material which blocks water and has an adequate dielectric constant. A protective mylar covering 28 of adequate dielectric constant is then applied over the cable core 11. The mylar 28 covering may be helically wrapped or longitudinally applied and may be wrapped with a helically applied binder (not shown).

Radial strength yarns (not shown) made of either aramid or fiberglass materials can be helically or contra-helically stranded around the mylar covering 28 and impregnated with water blocking filling compound such as a petroleum based hot melt filling compound manufactured by Witco Corporation, New York, N.Y. or Amoco Chemical Company, Chicago. The cable core 11 is then shielded and sheathed with appropriate protective layer to provide adequate electrical, mechanical and environmental performance. A longitudinally-applied corrugated or noncorrugated aluminum shield 32 used to enhance electrical properties is applied over the mylar 28 and the radial strength yarns (if present) and then a longitudinally-applied corrugated or noncorrugated helically wrapped steel armor 34 is applied over the aluminum shield yarns 32. The armor 34 is flooded with a water blockable flooding compound such as a hot melt adhesive or a petroleum based flooding compound. A high strength ripcord 36 is applied under the aluminum shield 32 to aid in sheath removal. A protective thermoplastic outer jacket 38 encapsulates the armor 34 to complete the structure. The protective thermoplastic outer jacket 38 is typically made of polyethylene (PE) or polyvinylchloride (PVC). Flame retardant additives may be added to the outer jacket 38 in order to pass flammability requirements of Underwriters Laboratories.

For the composite cable 10 using the loose tube construction, the size of the buffer tube, size of the central member, and stranded laylength determine stress-free operating window of the subgroup. The "stress-free operating window" is defined as the amount of linear expansion or contraction the stranded subgroup can experience without stressing the optical fibers. The basic equation used to determine the stress-free window (SW) is:

$$SW(\%) = (((BL^2 + (\pi*D1)^2)/(BL^2 + (\pi*D2)^2))^{0.5} - 1)*100$$

where:
 BL = Effective buffer tube laylength
 $D1 = (OD_{cm}) + (OD_{bt}*2) - (WALL*2) - (OD_{fb})$
 $D2 = (OD_{cm}) + (WALL*2) + (OD_{fb})$
 $OD_{bt}$ = Buffer tube outer diameter
 $OD_{cm}$ = Central member outer diameter
 WALL = Buffer tube wall thickness
 $OD_{fb}$ = Fiber bundle diameter The stress-free window (SW) may be increased or decreased depending on the tensile and/or environmental requirements. The amount of cable contraction (CC) can be calculated using the following basic equation:

$$CC(\%) = T*\alpha eff*100$$

and $$\alpha eff = (\Sigma AE\alpha)/(\Sigma AE)$$

WHERE:
 T = Temperature change
 αeff = Effective thermal expansion coefficient
 A = Cross-sectional area
 E = Elastic modulus temp. extreme
 α = Thermal expansion coefficient The threads, binders, gels and filling compounds are not considered elastic components and are not used n the calculation of αeff.

The amount of cable tensile elongation (CE) can be calculated using the following basic equation:

$$CE(\%) = F/(Eeff*\Sigma A)*100$$

and $$Eeff = (\Sigma AE)/(\Sigma A)$$

WHERE:
F=Cable tensile rating
Eeff=Effective elastic modulus

The minimum theoretical the stress-free window (SW) value can be obtained by adding the amount of cable contraction (CC) and the amount of cable tensile elongation (CE) together. A safety factor is typically added to the theoretical the stress-free window (SW) to allow for manufacturing, material and installation variances. The size of the buffer tube, size of the central member and stranded laylength also determine the radius of curvature of the optical fiber. The radius of curvature (Rc) can be calculated using the following basic equation:

$$Rc = Dh/2 * ((Ph/(\pi * Dh))^2 + 1)$$

WHERE:
Dh=Helix diameter
Ph=Helix pitch

The minimum value of the radius of curvature (Rc) for conventional single mode optical fibers should be above 40 mm in order to avoid attenuation increases.

In utilizing the above equations, the composite cable 10 can be properly designed in order to meet the required electrical, mechanical and handling standards.

Figure 3:
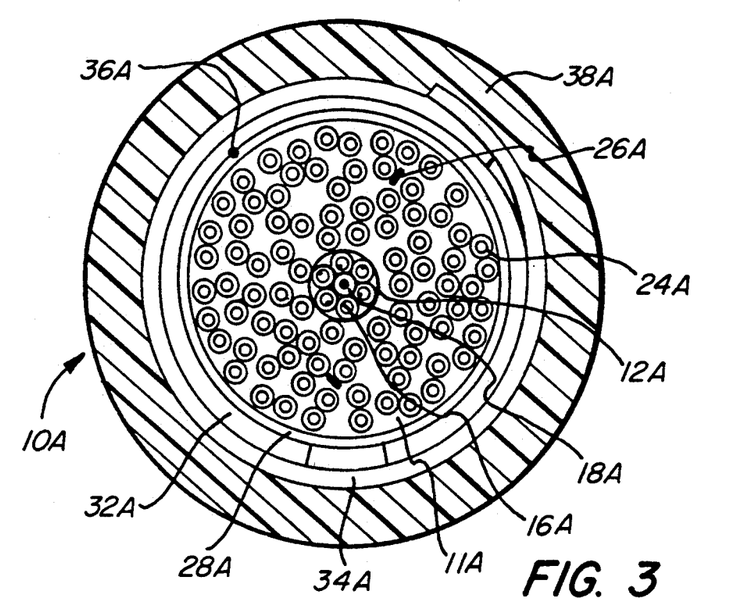
FIG. 3 is a cross-sectional view of an optical fiber/metallic conductor composite cable having a loose tube fiber subgroup located near the center of the cable core.

Turning now to FIG. 3, second embodiment of the present invention is illustrated. A composite cable 10A is identical to the composite cable 10 of FIGS. 1 and 2 except the optical fiber subgroup 12A is centrally located in the cable core 11A instead of being on the periphery. With the fiber subgroup 12A located in the center of the cable core 11A, the insulated metallic conductors 24A or groups of conductors are stranded around the fiber subgroup 12A. The stranding method may either be helical or reverse-helical. Components found in the composite cable 10A similar to those found in the composite cable 10 of FIGS. 1 and 2 have been identified with like numerals with the addition of the letter suffix A.

Figure 4:
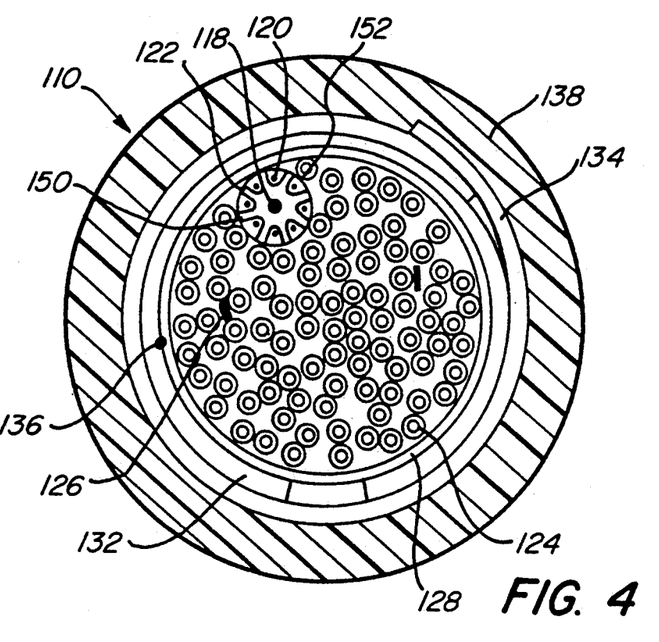
FIG. 4 is a cross-sectional view of an optical fiber/metallic conductor composite cable having a slotted core fiber subgroup located near the outer periphery of the cable core.

A third embodiment of the optical fiber/metallic conductor composite cable design of the present invention is shown in FIG. 4 and generally indicated by the numeral 110. The composite cable 110 is similar to the first embodiment of FIGS. 1 and 2, except the optical fiber subgroup 112 is of a slotted core construction. Components found in the composite cable 110 similar to those found in the composite cable 10 have been identified with like numerals except they have been increased by the addition of one hundred. It includes a cable core 111 made of an optical fiber subgroup 112 and an insulated metallic conductor subgroup 114.

In the slotted core construction of the optical fiber subgroup 112 located at the periphery of the cable core 111, a thermoplastic profile member 150 is extruded around a central member 118 made of metallic or dielectric material. A plurality of slots or grooves 152 which follow a helical or reversing helical path are located on the outer surface of the thermoplastic profile member 150. One or more optical fibers 120 lay in the slots 152 in a virtual stress-free condition. The optical fibers 120 may be loosely configured, grouped in bundles wrapped with binders (not shown), or held in a ribbon matrix. The optical fibers 120, fiber binders and ribbons are typically color coded for identification. The slots 152 also contain a thixotropic gel which blocks water penetration, but allows for fiber movement during cable expansion or contraction. One or more binders 122 are used to hold the optical fiber(s) in the slots. The binders 122 may be either helically or contra-helically applied about the thermoplastic profile member 150 and over the slotted core binders 122. The mylar tape (not shown) may also be applied about the profile member 150 and over the slotted core binders 122. The mylar tape may be helically wrapped or longitudinally applied and wrapped with a helically applied binder. The size of the thermoplastic profile 150, depth and width of the slots 152, and slot laylength determine stress-free operating window of the optical fiber subgroup 112. As will be appreciated by those skilled in the art, the theory and calculations previously set forth for and used in the loose tube construction can also be applied to the slotted core construction where:

BL=effective channel laylength
D1=$(OD_{cb}) - (OD_{fb})$
D2=$(OD_{cb}) - 2 \times (CD) + (OD_{fb})$
$OD_{cb}$=core body outer diameter
CD=channel depth
$OD_{fb}$=fiber bundle diameter.

The insulated metallic conductor subgroup 114 in the cable core 111 includes a plurality of color coded insulated metallic wires 124 wrapped by color coded wire binders 126, all of which are covered by mylar covering 128. Optionally, radial strength yarns (not shown) can be stranded over the mylar covering 128. In a manner similar to the first embodiment, the entire structure is encapsulated by shield 132, armor 134 and protective outer jacket 138. A ripcord 136 under the radial strength yarns 132 can be used during sheath removal.

Figure 5:
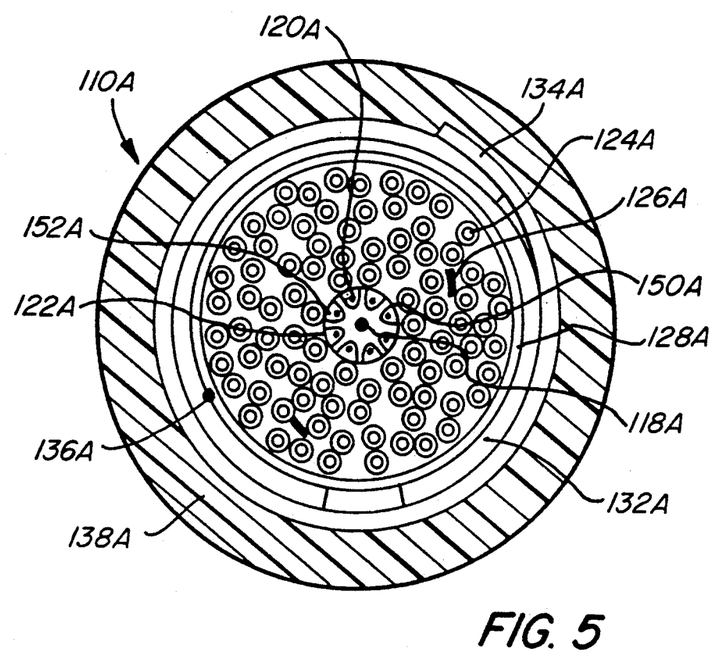
FIG. 5 is a cross-sectional view of an optical fiber/metallic conductor composite cable having a slotted core fiber subgroup located near the center of the cable core.

The fourth embodiment of the composite cable, generally indicated as numeral 110A in FIG. 5, is identical to the FIG. 4 embodiment, except the optical fiber subgroup 112A is centrally located in the cable core 111A. Components found in the FIG. 5 embodiment similar to those found in the composite cable 110 of FIG. 4 have been identified with like numerals with the addition of the letter suffix A. The previously set forth theory and calculations for the loose tube construction can also be used for the fourth embodiment.

Figure 6:
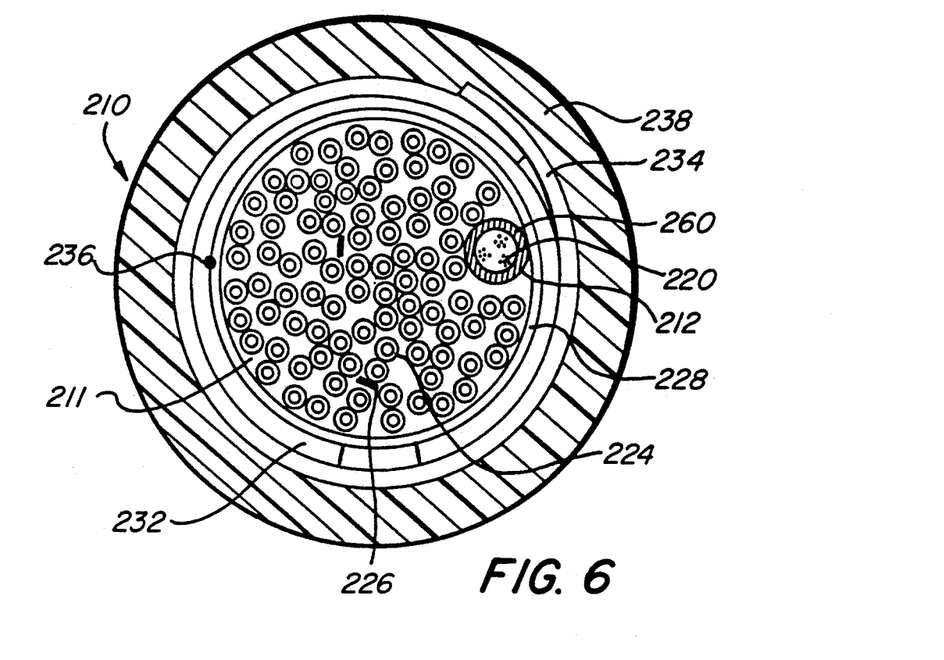
FIG. 6 is a cross-sectional view of an optical fiber/metallic conductor composite cable having a monotube fiber subgroup located near the outer periphery of the cable core.

A fifth embodiment of the optical fiber/metallic conductor composite cable design of the present invention is shown in FIG. 6 and generally indicated by numeral 210. The composite cable 210 is similar to the first and third embodiments of FIGS. 1-2 and 4, respectively, except the optical fiber subgroup 212 is of a unitube or monotube construction. Components found in the composite cable 210 similar to those found in the composite cable 10 have been identified with like numerals except they have been increased by the addition of two hundred.

In the unitube or monotube construction of FIG. 6, one or more optical fibers 220 are housed in a single oversized thermoplastic buffer tube 260. An example of a monotube construction is shown in U.S. Pat. No. 5,029,974. The optical fibers 220 may be loosely configured, grouped in bundles wrapped by binders (not shown) or held in a matrix by ribbons (not shown). The optical fibers 220, fiber binders and ribbons are typically color coded for identification. The hollow buffer tube 260 is typically filled with a thixotropic gel which blocks water penetration, but allows for fiber movement during cable expansion or contraction. A precise amount of fiber overlength within the buffer tube 260 is required in order for the fiber(s) to maintain a virtual stress-free condition during cable expansion. The amount of overlength is typically within 0.1–0.2% of the value for the amount of cable tensile elongation (CE). The fiber path may be represented by either a sine wave or helix. The radius of curvature (Rc) of the optical fiber(s) 220 can be calculated for either the sine wave or helix as follows:

SINE WAVE:

$$Rc = ((1 + [f'(x)]^2)^{3/2})/f''(x)$$

where:
$f(x)$ = Fiber path equation
$f'(x)$ = First derivative of equation
$f''(x)$ = Second derivative of equation.

The sinusoidal fiber path equation is:
$f(x) = A \sin((L/2\pi)x)$
$A = \frac{1}{2}(ID_{bt} - OD_{fb})$
$ID_{bt}$ = buffer tube inner diameter
$OD_{fb}$ = fiber bundle diameter
$L$ = length of one period HELICAL MODEL:
$R_c = D_h(2((P_h/(\pi D_h))^2 + 1)$
$P_h$ = helix pitch = $((2\pi A)^2/(L_f - 1))^{\frac{1}{2}}$
$D_h$ = helix diameter = $ID_{bt} - OD_{fb}$
$A = \frac{1}{2}(ID_{bt} - OD_{fb})$
$ID_{bt}$ = buffer tube inner diameter
$OD_{fb}$ = buffer tube outer diameter
$L_f$ = fiber overlength + 1

Figure 7:
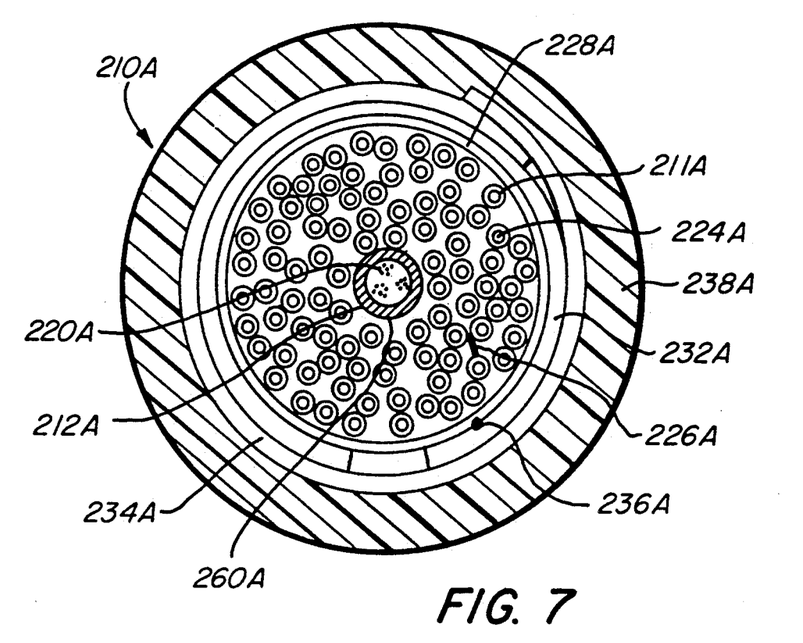
FIG. 7 is a cross-sectional view of an optical fiber/metallic conductor composite cable having a monotube fiber subgroup located near the center of the cable core.

A sixth embodiment of the invention is shown in FIG. 7 and generally indicated by the numeral 210A. The composite cable 210A is identical to the FIG. 6 embodiment, using the unitube or monotube construction for the optical fiber subgroup 212A. However, instead of being on the periphery of the cable core 211A, the optical fiber subgroup 212A is centrally located therein. Components found in the FIG. 7 embodiment which are similar to the FIG. 6 embodiment have been designated with similar reference numerals with the addition of the suffix A. The calculations set forth for the FIG. 6 embodiment can also be used for the FIG. 7 embodiment.

Figure 8:
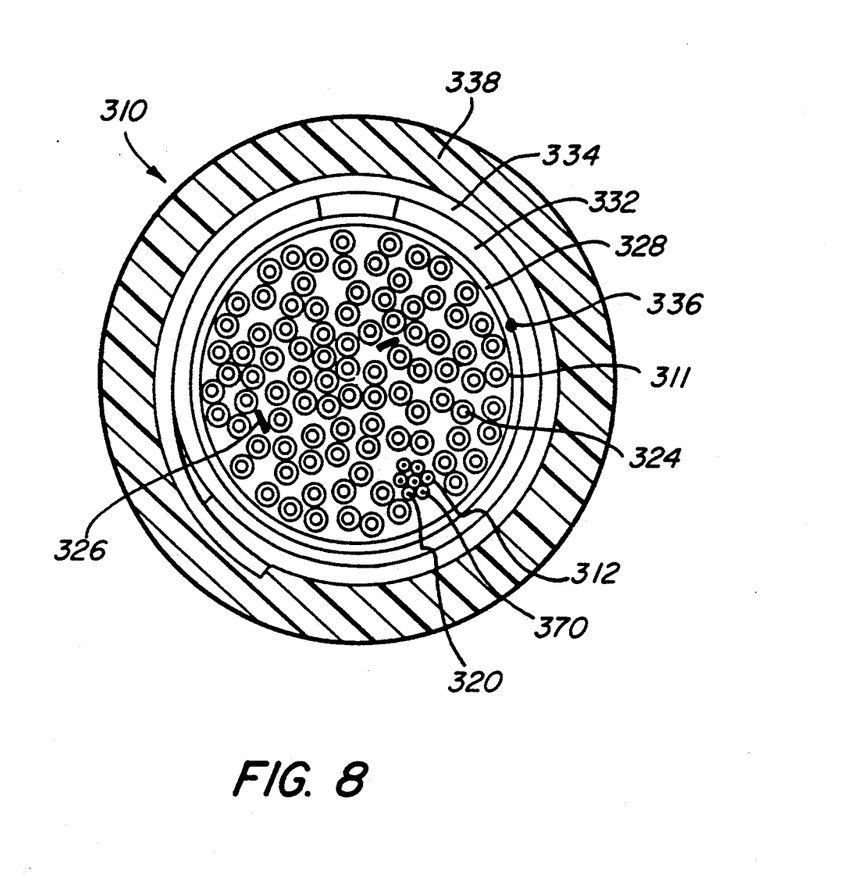
FIG. 8 is a cross-sectional view of an optical fiber/metallic conductor composite cable having a tight buffered fiber subgroup located near the outer periphery of the cable core.

A seventh embodiment of the composite cable invention is illustrated in FIG. 8 under general numeral 310. The composite cable 310 is similar to the first embodiment composite cable 10 of FIGS. 1 and 2, except it uses a tight buffer tube construction. Components found in the composite cable 310 similar to those found in the composite cable 10 have been identified with like numerals except they have been increased by the addition of three hundred.

In such a tight buffered construction shown in FIG. 8, each optical fiber 320 has one or more completely encapsulating layers 370 in order to provide mechanical protection. The inner surface of the inner most layer 370 is in direct contact with the optical fiber 320 so that there is no fiber overlength. The protective layer(s) 370 may be made of thermoplastic, silicone, acrylate, or other suitable materials. The protective layer(s) 370 typically has material properties which give the buffered fiber 320 good mechanical and thermal performance. The value of the cable tensile elongation (CE) for the buffered fiber 320 is typically less than 0.15% in order to provide low attenuation increase at low temperatures. The formulas for cable tensile elongation (CE) for tight buffer construction is the same as that previously given for loose tube construction.

One or more tight buffered fibers 320 can be in the subgroup 312. The tight buffered optical fibers 320 may be loosely configured, grouped in binder wrapped bundles, or stranded together to form bundles. The tight buffered optical fibers 320 and fiber binders are typically color coded for identification.

It should be appreciated by these skilled in the art that each fiber subgroup may also be sheathed to produce a protected subcable in order to facilitate separation and branching of the subgroups. The sheathing may be various combinations of helically or contra-helically stranded strength yarns optionally impregnated with a water blocking filling compound; metallic armor which may be either corrugated or helically wrapped; and a protective thermoplastic outer jacket typically made of polyethylene (PE) or polyvinylchloride (PVC). Flame retardant additives may be added to the outer jacket in order to pass the flammability requirements of Underwriters Laboratories.

Additionally, if the interior of the cable is not filled with either optical or metallic subgroups, then flexible plastic filler rods (not shown) can be used to fill up the excess space so the cable can maintain its circular cross-section.

Thus, it can be seen from the foregoing specification and attached drawings that the optical fiber/metallic conductor composite cables of the present invention provides effective cable designs which emphasize the positive features and minimizes the negative features of the prior art. The cables are ruggedly built and will function adequately for a very long period of time.

The preferred embodiments admirably achieve the objects of the present invention; however, it should be appreciated that departures can be made by those skilled in the art without departing from the spirit and scope of the invention which is limited only by the following claims.

What is claimed is:

1. A composite cable for transmitting both electrical signal transmissions and fiber optic signal transmissions comprised of:
   a cable core having an optical fiber subgroup for the fiber optic signal transmissions and at least one metallic conductor subgroup for the electrical signal transmissions, said core having a generally circular cross-section;
   said optical fiber subgroup having a plurality of optical fibers therein for conducting the fiber optic transmissions, said plurality of optical fibers being bundled together to form said subgroup, said optical fiber subgroup being separate and distinct from said metallic conductor subgroup but being bundled therewith, said optical fiber subgroup has a plurality of gel filled buffer tubes stranded around a central strength member, each gel filled buffer tube contains at least one of said plurality of optical fibers, said buffer tubes and strength member being held in place relative to one another by a binding material which excludes said metallic conductor subgroup from said optical fiber subgroup;
   said at least one metallic subgroup having individually insulated metallic conductors for the electrical signal transmissions;
   a water blockable filling compound impregnating said cable core; and
   a plastic jacket which encapsulates said cable core.

2. A cable as described in claim 1 wherein said optical fiber subgroup extends along an outer periphery of said cable core.

3. A cable as described in claim 2 wherein said optical fiber subgroup runs parallel to a longitudinal axis of said cable.

4. A cable as described in claim 2 wherein said optical fiber subgroup follows a helical path along said outer periphery.

5. A cable as described in claim 1 wherein said optical fiber subgroup is centrally located in said cable and follows a longitudinal axis of said cable.

6. A cable as described in claim 1 wherein said optical fiber subgroup is provided with a stress-free operating window (SW) which substantially satisfies the equation:

$$SW(\%) = (((BL^2 + (\pi*D1)^2)/(BL^2 + (\pi*D2)^2))0.5 - 1)*100$$

Where:
BL = Effective buffer tube laylength
$D1 = (OD_{cm}) + (OD_{bt}*2) - (WALL*2) - (OD_{fb})$
$D2 = (OD_{cm}) + (WALL*2) + (OD_{fb})$
$OD_{bt}$ = Buffer tube outer diameter
$OD_{cm}$ = Central member outer diameter
WALL = Buffer tube wall thickness
$OD_{fb}$ = Fiber bundle diameter 7. A cable as described in claim 6 wherein a minimum for the stress-free operating window (SW) is calculated by adding the amount of cable contraction (CC) and cable tensile elongation (CE) together where:

$$CC(\%) = T*\alpha eff*100$$

and $$\alpha eff = (\Sigma AE\alpha)/(\Sigma AE)$$

where:
T = Temperature change
αeff = Effective thermal expansion coefficient
A = Cross-sectional area
E = Elastic modulus temp. extreme
α = Thermal expansion coefficient
and $$CE(\%) = F/(Eeff*\Sigma A)*100$$

and $$Eeff = (\Sigma AE)/(\Sigma A)$$

where:
F = Cable tensile rating
Eeff = Effective elastic modulus

8. A cable as described in claim 1 wherein a metallic shield is disposed between said cable core and said jacket.

9. A cable as described in claim 8 wherein said metallic shield is corrugated.

10. A cable as described in claim 9 wherein a water blockable flooding compound is disposed between said metallic shield and said jacket.

11. A cable as described in claim 8 wherein said metallic shield is a longitudinally applied aluminum protective coating with a steel armor longitudinally applied therearound.

12. A cable as described in claim 1 further including a ripcord longitudinally disposed under said plastic jacket.

13. A composite cable for transmitting both electrical signal transmissions and fiber optic signal transmissions comprised of:

a cable core having an optical subgroup for the fiber optic signal transmissions and at least one metallic conductor subgroup for the electrical signal transmissions, said core having a generally circular cross-section;

said optical fiber subgroup having a plurality of optical fibers therein for conducting the fiber optic transmissions, said plurality of optical fibers being bundled together to form said subgroup, said optical fiber subgroup being separate and distinct from said metallic conductor subgroup but being bundled therewith, said optical fiber subgroup has a core body with a plurality of helical channels therein, said core body having a strength member centrally located therein, each channel is gel filled and contains at least one of said plurality of optical fibers, said optical fibers being held in said channels by a binder material;

said at least one metallic subgroup having individually insulated metallic conductors for the electrical signal transmissions;

a water blockable filling compound impregnating said cable core; and a plastic jacket with encapsulates said cable core.

14. A cable as described in claim 13 wherein said optical fiber subgroup extends along an outer periphery of said cable core.

15. A cable as described in claim 14 wherein said optical fiber subgroup runs parallel to a longitudinal axis of said cable.

16. A cable as described in claim 14 wherein said optical fiber subgroup follows a helical path along said outer periphery.

17. A cable as described in claim 13 wherein said optical fiber subgroup is centrally located in said cable and follows a longitudinal axis of said cable.

18. A cable as described in claim 13 wherein said optical fiber subgroup is provided with a stress-free operating window (SW) which substantially satisfies the equation:

$$SW(\%) = (((BL^2 + (\pi*D1)^2)/(BL^2 + (\pi*D2)^2))0.5 - 1)*100$$

where:
BL = effective channel laylength
$D1 = (OD_{cb}) - (OD_{fb})$
$D2 = (OD_{cb}) - 2x(CD) + (OD_{fb})$
$OD_{cb}$ = core body outer diameter
CD = channel depth
$OD_{fb}$ = fiber bundle diameter.

19. A cable as described in claim 18 wherein a minimum for the stress-free operating window (SW) is calculated by adding the amount of cable contraction (CC) and cable tensile elongation (CE) together where:

$$CC(\%) = T*\alpha eff*100$$

and $$\alpha eff = (\Sigma AE\alpha)/(\Sigma AE)$$

where:
T = temperature change
αeff = effective thermal expansion coefficient

A = cross-sectional area
E = elastic modulus temp. extreme
α = thermal expansion coefficient and $$CE(\%) = F/(Eeff*\Sigma A)*100$$

and $$Eeff = (\Sigma AE)/(\Sigma A)$$

where:
F = cable tensile rating
Eeff = effective elastic modulus.

20. A cable as described in claim 13 wherein a metallic shield is disposed between said cable core and said jacket.

21. A cable as described in claim 20 wherein said metallic shield is corrugated.

22. A cable as described in claim 21 wherein a water blockable flooding compound is disposed between said metallic shield and said jacket.

23. A cable as described in claim 20 wherein said metallic shield is a longitudinally applied aluminum protective coating with a steel armor longitudinally applied therearound.

24. A cable as described in claim 13 further including a ripcord longitudinally disposed under said plastic jacket.

25. A composite cable for transmitting both electrical signal transmissions and fiber optic signal transmissions comprised of:
  a cable core having an optical fiber subgroup for the fiber optical signal transmissions and at least one metallic conductor subgroup for the electrical signal transmissions, said core having a generally circular cross-section;
  said optical fiber subgroup having a plurality of optical fibers therein for conducting the fiber optic transmissions, said plurality of optical fibers being bundled together to form said subgroup, said optical fiber subgroup being separate and distinct from said metallic conductor subgroup but being bundled therewith, said optical fiber subgroup has a single gel filled oversized buffer tube having said plurality of optical fibers therein, said fibers are provided with an overlength to maintain a virtual stress-free condition during cable expansion;
  said at least one metallic subgroup having individually insulated metallic conductors for the electrical signal transmissions, at least some of said individually insulated metallic conductors being adjacent to and in contact with said single gel filled oversized buffer tube of said optical fiber subgroup;
  a water blockable filling compound impregnating said cable core; and
  a plastic jacket which encapsulates said cable core.

26. A cable as described in claim 25 wherein said optical fiber subgroup extends along an outer periphery of said cable core.

27. A cable as described in claim 26 wherein said optical fiber subgroup runs parallel to a longitudinal axis of said cable.

28. A cable as described in claim 26 wherein said optical fiber subgroup follows a helical path along said outer periphery.

29. A cable as described in claim 25 wherein said optical fiber subgroup is centrally located in said cable and follows a longitudinal axis of said cable.

30. A cable as described in claim 25 wherein said overlength of said optical fiber is in a range of 0.1% to 0.2% of cable tensile elongation.

31. A cable as described in claim 25 wherein a metallic shield is disposed between said cable core and said jacket.

32. A cable as described in claim 31 wherein said metallic shield is corrugated.

33. A cable as described in claim 32 wherein a water blockable flooding compound is disposed between said metallic shield and said jacket.

34. A cable as described in claim 31 wherein said metallic shield is a longitudinally applied aluminum protective coating with a steel armor longitudinally applied therearound.

35. A cable as described in claim 25 further including a ripcord longitudinally disposed under said plastic jacket.

36. A composite cable for transmitting both electrical signal transmissions and fiber optical signal transmissions comprised of:
  a cable core having an optical fiber subgroup for the fiber optic signal transmission and at least one metallic conductor subgroup for the electrical signal transmissions, said core having a generally circular cross-section;
  said optical fiber subgroup having a plurality of optical fibers therein for conducting the fiber optic transmission, said plurality of optical fibers being bundled together to form said subgroup, said optical fiber subgroup being separate and distinct from said metallic conductor subgroup but being bundled therewith, each optical fiber of said optical fiber subgroup has at least one encapsulating layer to form a tight buffer tube thereon in direct contact with its respective optical fiber so that there is no fiber overlength;
  said at least one metallic subgroup having individually insulated metallic conductors for the electrical signal transmissions;
  a water blockable filling compound impregnating said cable core; and
  a plastic jacket which encapsulates said cable core.

37. A cable as described in claim 36 wherein said optical fiber subgroup extends along an outer periphery of said cable core.

38. A cable as described in claim 37 wherein said optical fiber subgroup runs parallel to a longitudinal axis of said cable.

39. A cable as described in claim 37 wherein said optical fiber subgroup follows a helical path along said outer periphery.

40. A cable as described in claim 36 wherein a metallic shield is disposed between said cable core and said jacket.

41. A cable as described in claim 40 wherein said metallic shield is corrugated.

42. A cable as described in claim 41 wherein a water blockable flooding compound is disposed between said metallic shield and said jacket.

43. A cable as described in claim 40 wherein said metallic shield is a longitudinally applied aluminum protective coating with a steel armor longitudinally applied therearound.

44. A cable as described in claim 36 further including a ripcord longitudinally disposed under said plastic jacket.

* * * * *